United States Patent [19]

Nertman

[11] Patent Number: 4,496,052

[45] Date of Patent: Jan. 29, 1985

[54] BLISTER PACKAGE WITH MEANS FOR SECURING BLISTER

[75] Inventor: Inge Nertman, Kungälv, Sweden

[73] Assignee: AB Volvo, Goteborg, Sweden

[21] Appl. No.: 474,593

[22] PCT Filed: Jul. 5, 1982

[86] PCT No.: PCT/SE82/00236

§ 371 Date: Feb. 22, 1983

§ 102(e) Date: Feb. 22, 1983

[87] PCT Pub. No.: WO83/00133

PCT Pub. Date: Jan. 20, 1983

[30] Foreign Application Priority Data

Jul. 6, 1981 [SE] Sweden ................................ 8104179

[51] Int. Cl.³ ............................................. B65D 73/00
[52] U.S. Cl. ...................................... 206/470; 24/615;
24/651; 29/523; 206/461; 220/272
[58] Field of Search ................ 24/94, 615, 651, 679,
24/687; 29/522 R, 522 A, 523; 53/410, 412,
420, 421, 423, 427, 453, 455, 471, 486; 215/358,
361; 206/461–471; 220/307, 309, 31 S, DIG.
19, 272, 273, 305

[56] References Cited

U.S. PATENT DOCUMENTS

| | | | |
|---|---|---|---|
| 2,954,890 | 10/1960 | Del Valle | 215/358 |
| 3,191,564 | 6/1965 | Fraze | 29/522 R |
| 3,366,267 | 1/1968 | Boyer | 220/309 |
| 3,602,980 | 9/1971 | Heffner | 29/522 R |
| 3,670,405 | 6/1972 | Dochterman | 29/523 |
| 3,812,963 | 5/1974 | Zahuranec et al. | 206/468 |
| 4,087,019 | 5/1978 | Yamazaki | 220/309 |
| 4,413,748 | 11/1983 | Kessler et al. | 220/307 |

FOREIGN PATENT DOCUMENTS

| | | | |
|---|---|---|---|
| 1432236 | 1/1969 | Fed. Rep. of Germany | 220/307 |
| 2533235 | 2/1977 | Fed. Rep. of Germany | 206/461 |
| 583267 | 10/1958 | Italy | 220/307 |
| 329090 | 5/1930 | United Kingdom | 220/309 |

Primary Examiner—George E. Lowrance
Assistant Examiner—Jimmy G. Foster

[57] ABSTRACT

A first part of plastic material (7), preferably a component of a package, is secured to a second part (2). Tubular projections (9) are formed in the first part and are introduced through a hole (4) in the second part. The projection (9) is shaped with an outer terminating portion (11, 12) closing the same, and forming a vaulted termination extending outwardly and provided with such a crease that it can be brought to an at least somewhat inwardly bulging position. After the second part (2) with its hole (4) has been placed on the projection (9), a surface is laid against the vaulted termination and is pressed against the same, so that it is inversely forced into its inwardly bulging position. In this position it causes such a widening of the portion (10;14) of the projection located inside of the termination that this portion forms a rivet head (13;19).

1 Claim, 5 Drawing Figures

BLISTER PACKAGE WITH MEANS FOR SECURING BLISTER

TECHNICAL FIELD

The present invention relates to a method to secure a first part of a plastic material to a second part. The first part may constitute part of a package assembly such as the main part of a blister package. A securing means for carrying out the method is also comprised by the invention.

BACKGROUND

Blister packages comprise a package part in the form of a hot formed plastic sheet usually of the transparent type. The plastic sheet is provided with at least one deep embossed portion, which forms a container for the article to be packed. Thus, the plastic sheet forms the laterals and the top portions of the container, but the package requiring an additional closing sheet on the side of the embossed cavity left open. It is therefore a very common feature that a piece of cardboard is placed against the plastic sheet to be secured to the same. In certain cases a container stretching in opposite directions from the plastic sheet is desired, and then two deepembossed plastic sheets can be laid together, their plane, not embossed portions being fitted to each other. There are also packages in which the plastic sheet has been folded, so that two portions are formed, which can be fitted to each other.

In order to hold together the two parts or portions thus required for the sealing of the package, a great number of different means have been used. Staples or similar and a seal made by means of a glueing or welding operation are quite common. It has also been suggested that tube shaped projections might be shaped in the plastic sheet by means of a hot forming operation, which projections might be riveted to a retaining rivet head. More particularly the invention relates to this type of securing means.

TECHNICAL PROBLEM

However, the fastening means mentioned require comparatively complicated accessories. When using staples, metal parts are also introduced which can give rise to drawbacks, and when glueing or welding as well as when recurring to a riveting operation of the type mentioned, a great portion of the package must be destroyed, when the same is opened up, which in many cases may signify a drawback. The said riveting of tube shaped projections mentioned above has moreover not proved to bring about any satisfactory results, as a pressing down of the projection in order to try to form a rivet head turns out to be a process that cannot be controlled and can lead to that a bellow is formed instead of riveting. As seen in a manufacturing perspective a riveting process by flanging out an open projection is disadvantageous, as it requires punching holes in the projection and great precision in the riveting operation.

THE SOLUTION

In the solution indicated by means of the invention the plastic sheet is shaped with an embossed projection with a terminating portion closing said projection and which is forming a vaulted termination in outwards direction extending from the transition to the inner tubular portion of the projection. The same is provided with such creasing rules that it can be brought to an at least somewhat inwards folded position, whereby a surface, in order to obtain the secured condition, is placed on said termination and pressed against the same, so it is moved to its inwards folded condition. The vaulted termination is adapted in such a way that it in this position so is widening the portion of the projection located inside of the termination that it forms a rivet head. By means of the invention a method is developed to join parts of blister packages or similar, an excellent joint being achieved by the material itself being utilized for the joint without any extraneous parts being required.

ADVANTAGES

By means of the invention a joint is also obtained that by very simple means can be locked in an automatic operation as well as by hand, and in the latter case practically without the use of any accessory equipment.

The holding device can be designed as a spring lock, which by simple means can be locked in order to produce a fixed joint.

BRIEF DESCRIPTION OF DRAWINGS

An example of application of the invention is illustrated in the accompanying drawings, two embodiments thereof being shown.

BEST MODE OF CARRYING OUT THE INVENTION

Figure 1:
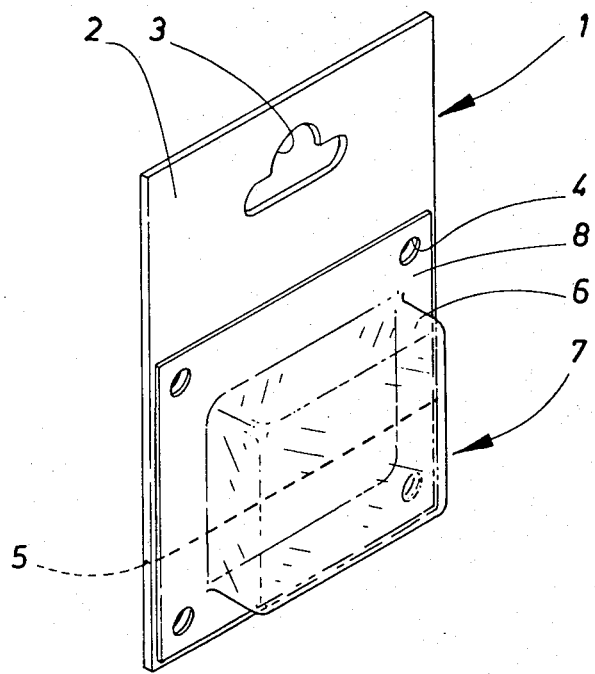
FIG. 1 shows a perspective view of a package, in which the invention has found an application.

The package 1 illustrated in FIG. 1 comprises as a first part, its main part, a plastic sheet 7 shaped to constitute a container 6 and outside of the container cavity exhibiting a brim. The plastic sheet 7 is preferably made of a transparent material, and the container 6 is intended to enclose the article to be packed. A second part moreover forms part of the package, viz. a sheet of cardboard 2 provided with a hole 3 permitting the package unit to be hung up and four small holes 4 and a crease line 5 serving the purpose of a folding indication. That is the second part of the package.

Figure 2:
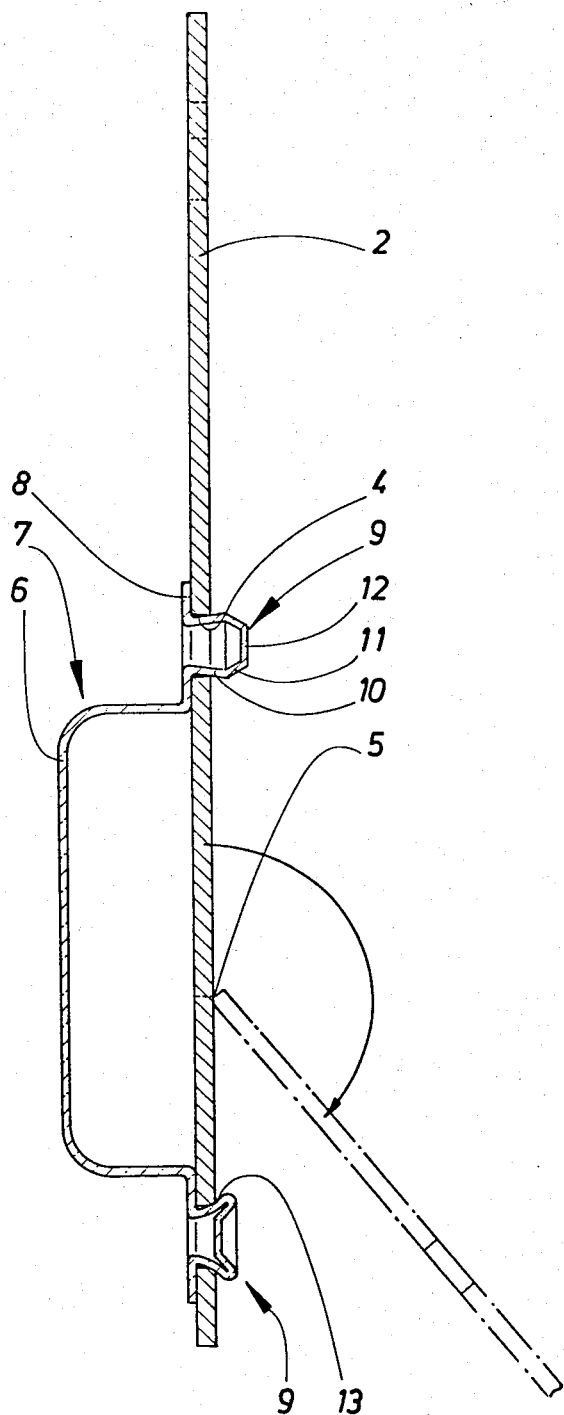
FIG. 2 is a sectional view of the package according to FIG. 1 shown on an enlarged scale, and FIGS. 3, 4 and 5 on an enlarged scale illustrate additional sectional views of the holding device according to the invention in the two embodiments, the second one being shown in two positions.

The plastic sheet 7 is placed in such a manner that its brim 8 covers the four small holes 4 of the cardboard sheet. Right in front of said holes the brim is formed with four outwards stretching, tube shaped projections 9 (FIG. 2). The projections 9 as well as the container 6 are intended to be shaped from a plane plastic sheet, which also forms the brim 8. This shaping can be made by means of prior known methods either vacuumshaping or embossing after treating of the plastic sheet.

It is important that the projections 9 are given a determined shape. Uppermost in FIG. 2 and in FIG. 3 an embodiment is shown of the projection. Its form is composed of an inner, tapering conical widening portion 10 projecting from the brim 8 and by a conically narrowing, outer portion 11 terminating in a closed portion 12, which as is shown, is plane, but it can also be slightly arched, preferably in outwards direction. The greatest diameter of the projection 9, where the portions 10 and 11 blend into each other, is suitably somewhat greater than the hole 4. The projection exhibits a circular cross-section.

Figure 4:
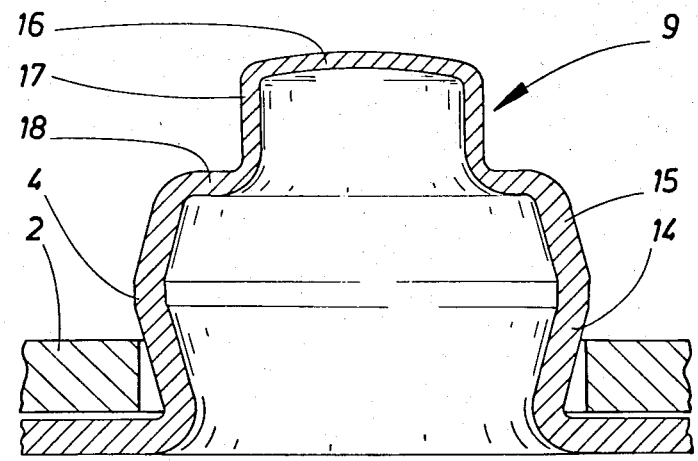

In the second embodiment of the projection 9 according to FIG. 4 the portions described are substantially the same, but of a somewhat different design. Thus, there is an inner in outwards direction widening portion 14 and an outer in outwards direction narrowing portion 15 and as a termination a portion 16 closing the projection. However, the outer portion 15 and the closing portion 16 blend into each other via an outer cylindrical portion 17 and a shoulder forming an inner substantially plane portion 18. It can be said that the portions 17 and 18 form an outer crease around the closing portion 16.

The plastic material of the sheet 7 is somewhat resilient, and because thereof the projection can be introduced into the hole 4, even if this hole is of a somewhat smaller diameter than the projection. If said greatest diameter is so great that a retention is obtained against the edge of the hole 4, but not greater than such an inwards working resiliency of the plastic material being permitted that said greatest diameter can pass through the hole for a certain number of times without the hole getting widened to the diameter of the projection, a spring lock effect is obtained. When a pressure is exercised in inwards or outwards direction by the projection 9 relative to the hole 4, the inwards directed forces, required for said passage through the hole and engagement to its walls respectively are obtained against the periphery of the projections because of the inner and outer conical angles.

However, the most important object of the invention is not the production of a spring lock but to bring about a means, which makes possible a fixed joint, which can be locked in a simple manner. In such connection one can depart from a spring lock, which anyhow is not necessary; the hole 4 can be designed with a greater diameter than the projection, but this is as a rule less advantageous. This spring lock can be utilized during a first phase and later on be exchanged to a fixed joint. In one and the same package certain ones of the securing means can be utilized as spring locks and other ones as fixed joints, which will be described further on.

Figure 3:
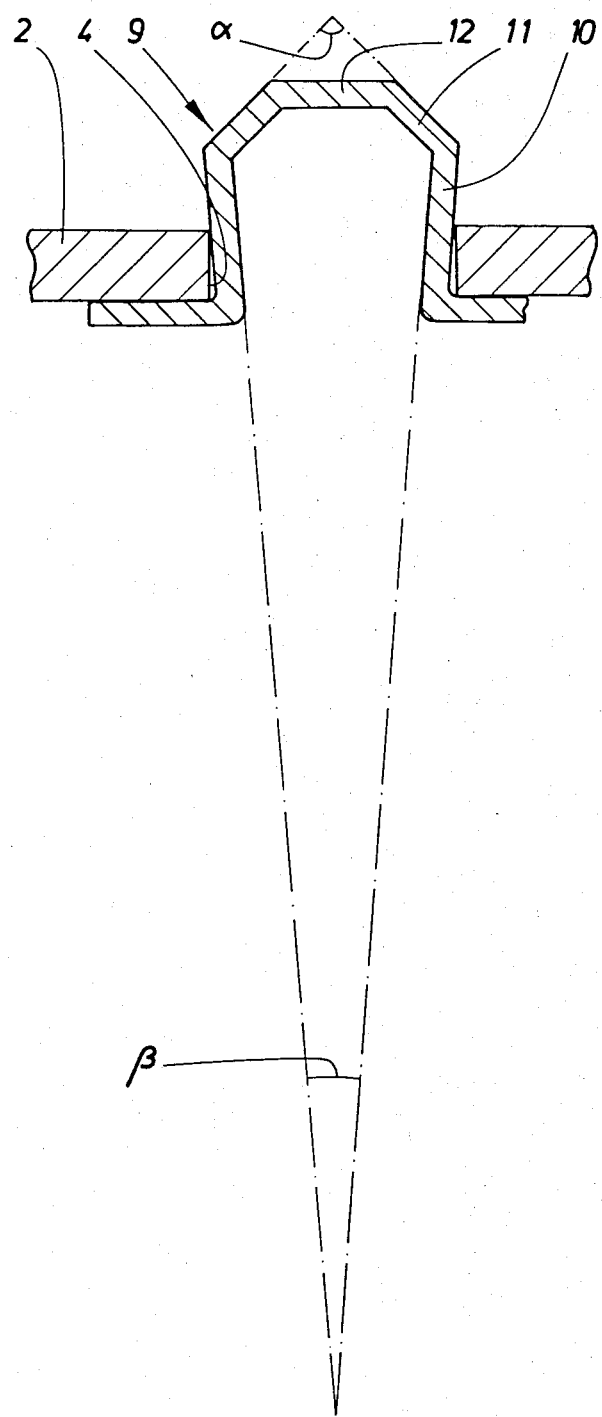
Figure 5:
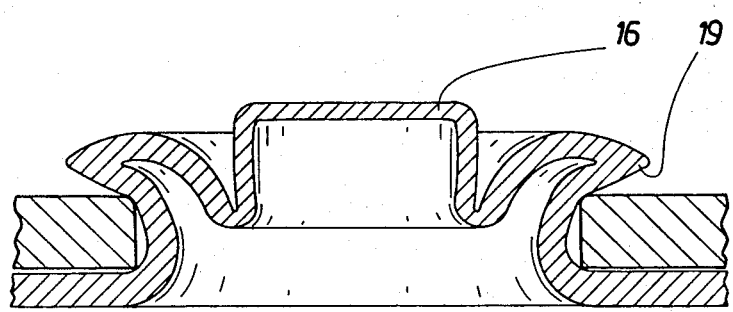

The locking to a fixed joint takes place by the vaulted termination of the projection 9 formed by the outer portion 11 and the closing portion 12 and the portions 15–18 respectively being inversely forced from its outwards directed position shown at the top in FIGS. 2, 3 and in FIG. 4 into a more inwards directed position, as is shown at the bottom of FIG. 3 and in FIG. 5 respectively. In this position the folded-in portions tend to widen the projection, which results in an outwards bulging flange 13 (in FIG. 2) and 19 (in FIG. 5) respectively, which projects in outwards direction past the edge of the hole 4. The joint will be fixed and cannot be loosened without destroying the cardboard sheet round the hole 4.

Experiments have proved that the described function occurs in a satisfactory manner. Thus, the projection can very well be formed to constitute a spring lock, which functions well even together with a material of a counterpart of less strength, such as cardboard. For this type a well functioning design can be obtained by means of a vacuum forming process. Of course it is thereby necessary to draw the projection out of the hole of the form. It has also been found that the "riveting" of the projection, so that it acquires the shape illustrated at the bottom of FIG. 3 and FIG. 5 respectively, is very easy to perform and yield a good locking effect, after the projection has been widened by the folding-in of the vaulted termination. The folding-in of the same is simply performed by exercising a pressure on the outer surface of the closing portion 12 and 16 respectively. The termination then starts pivoting in inwards direction causing the portion 11 and 15 respectively to fold in outwards direction thereby widening the edge of the portion 10 and 14 respectively. When the closing portion starts approaching a position right in front of the edge between the portions 10 and 11 and 14 and 15 respectively the portion 11 and 15 respectively passes a position of equilibrium, in which outwards and inwards directed forces balance each other, which makes said closing termination acquire an inversely and at least somewhat inwards folded position. Shortly after it has passed its position of equilibrium, an over-centre effect arises, which causes the "riveting head" to be retained in a stable position. It is not necessary that the locking is performed by pressing a mandrel against the portion 12 and moving it into the illustrated position. Thus, it is possible to exercise the pressure by means of a plane surface, and in case there are several projections on the same level, this surface can be common for all the projections. This is a very distinct advantage, as, if mandrels should be required, they have to be adapted as to their position relative to the different projections, and each operation would require the centration of each one of the mandrels relative to each individual projection.

In order to secure said effect, certain conditions must be fulfilled. Thus, the thickness and the flexibility of the material of the projection must be in a certain relation to the hardness of the material of the counterpart, as the joint otherwise will not acquire a uniform strength. The retaining force obtained also depends on these factors and on the angles chosen. Also with regard to the inversely forcing of the vaulted termination into locked position certain factors must be observed. Thus, the hardness of the material and its resiliency must permit said inversely forcing of the termination at the same time as the material must retain its springing property and permit the folding operation, so that the above over-centre effect, which retains the termination in its introduced position really works. The geometric parameters must moreover be such that the inversely forced termination will not have space to be accommodated in the portion 11 and 14 respectively with their shapes unchanged. As a matter of fact the inversely forcing of the termination must signify that it widens the walls of this portion and produces said riveting effect shown. In this connection it should also be noted that the termination according to the first embodiment in its inversely forced-over position exhibits a veered relationship between the portions 11 and 12, which means that the angle shown at the top of FIG. 3 will not be the same in the mirror-inverted position, said angle instead due to the springing forces tending to be greater, which contributes to the widening of the portion 10. It is also of great value for the riveting effect that the inner portion, which during the riveting operation shall be inversely forced outwards, already from the start exhibits a somewhat conical shape, i.e. widening in outwards direction. By this arrangement a more accentuated effect of the outwards working inverse force is obtained than if the portion from the start would be of cylindric shape.

The projection has in the foregoing been described in terms, from which it is evident that it constitutes a body of revolution. By means of such a design the same material factors and geometric conditions are obtained in all directions, and a well controlled riveting effect is achieved. It is easy to manufacture the tools for this shape. However, it cannot be excluded that the invention can find an application also in case of other shapes, in the first place in connection with well rounded forms like such ones exhibiting an elliptical cross-section.

It is difficult or impossible to indicate any definite conditions for the design due to the great number of factors that may be changed. However, general rules have been given above for what shall be obtained, and a person skilled in the art should be able to adapt the design to the existing material factors and objects desired with regard to function, so that the described intended effect will be obtained. However, the design illustrated at the top of FIG. 3 has turned out to function well. A plastic sheet of a thickness of 0.25 0.40 mm and a total height of 5.5 mm for the projection has been found to be suitable. The greatest diameter at the transition between the portions 10 and 11 was in the range of 7.5 mm in the experimental work, while the diameter of the closing portion 12 was 3 mm. The conical angle $\alpha$ for the portion 11 was 90°, and the conical angle $\beta$ for the portion 10 was 10°.

In the second embodiment according to FIGS. 4 and 5 a very good riveting effect is obtained due to the cylindrical portion 17, which is practically not at all deformed in connection with the riveting operation, and due to the folding direction implied by the crease between the portions 17 and 18. The outwards inversely forcing of the inner portion and the formation of the riveting head is practically not at all affected by such factors as an obliquely working abutting pressure or deficient uniformity of the characteristics of the material.

The package illustrated in FIGS. 1 and 3 is intended to be used in the following manner: After the manufacture of the two parts 1 and 7, the article to be packed is inserted into the container 6, and the cardboard sheet 1 is by means of its holes 4 springingly pressed the four projections 9. The two projections, shown at the bottom in FIG. 3, are thereafter pressed against a plane. The vaulted termination then moves inversely, as has been described and is shown at the bottom of FIG. 3, and the cardboard sheet is locked to the part 7, from which it cannot be removed without exercising damaging force. On the other hand the connection at the two upper projections can be loosened. This is performed by folding the upper portion of the cardboard sheet above the crease line 5 in outwards direction as counted from the projections, said portion of the cardboard sheet then being springingly drawn off from said projections. Said portion of the cardboard sheet is thus folded-out as is shown with dashed and dotted lines in FIG. 3, and the content of the container 6 will be accessible. If the package does contain several details, it is thus possible to remove only certain ones, or to take out the article for inspection, measurement and similar. If it is desired to again close the package, one only needs to put up the downwards folded portion of the cardboard sheet and again press it on onto the two projections 9. During the whole operation both parts are kept together, and the container remains partly closed, so that there is no risk of the article or articles unintentionally falling out. If it is desired to completely seal the package, also the two remaining projections may be "riveted". In order to open up the package one has to destroy the cardboard sheet round the projections. In certain cases, where one does not want anybody to open the package without it being possible to notice it afterwards, such a destruction of an opened-up package may be desirable. The advantage in this case is the utterly simple manner, in which the locking can be performed, thus merely by placing the package against the plane and pressing it against the same, so that all terminations will snap-in. Under certain conditions a springing restoring of the termination may be possible, so that the projection recovers its original form. However, the first moving-over operation to the position illustrated at the bottom of FIG. 3 may often give rise to such material strain that an additional similar operation may not be performed.

Thus, the package illustrated in FIGS. 1 and 3 exhibits a very good function when handled in connection with a filling operation as well as in connection with its closing and use. This advantageous function is based upon the simple handling of the locking elements, viz. the projections 9, but also as a result of the design of the package, which can be opened and again closed, and in which the parts also in an open-up condition are kept together, and in which the extent of the opening range of the container can be varied, which can take place by changed placement of the crease line relative to the opening of the container cavity.

As is evident from the description, the holding device has been formed by utilizing the material of the sheet, which constitutes the main component of the package, and by means of the same manufacturing means, which are used, when the rest of the sheet is shaped to the blister package. This results in the holding device getting the form of a tubular projection, and the object of the invention is thus to bring about a widening of this projection, so that a holding effect is obtained. Experiments have proved that it is not possible to obtain an accentuated secure riveting effect by merely pressing together a cylindrical projection with a plane termination. A widening of an outwards open tubular projection on the other hand produces great strains on the material and creates great centration problems. Compared therewith the holding device according to the invention comes out as very advantageous. A very secure repeatable riveting effect is obtained, and the riveting can be performed by the simplest imaginable means: the pressing of a plane against the end of the projection. By this arrangement all centration problems are avoided.

I claim:

1. Means for securing a first part, of plastic material, such as a blister package, to a second part, such as a sheet of cardboard, said securing means comprising: at least one projection to be passed through a hole in the second part, each projection having an inner tubular portion to be located in the respective hole, and an outer portion, said outer portion having a first tubular portion connected to said inner tubular portion, a second tubular portion of a diameter smaller than said first tubular portion, an annular shoulder portion interconnecting said first and second tubular portions, and a vaulted termination portion connected to said second tubular portion and closing said projection; said projection being adapted to occupy a first position in which said first and second tubular portions project outwardly beyond the respective hole, and a second position in which said second tubular portion is snapped inside said shoulder portion and at least partly inside said first tubular portion and in which said first tubular portion is widened radially outwardly beyond the width of and outside the hole, whereby said projection forms a rivet locking said first part to said second part.

* * * * *